Sept. 26, 1961     C. A. MILLS     3,001,382
RADIANT COOLING SYSTEMS

Filed June 16, 1958     2 Sheets—Sheet 1

INVENTOR.
CLARENCE A. MILLS,
BY
ATTORNEYS.

INVENTOR.
CLARENCE A. MILLS,
BY
ATTORNEYS 3,001,382
RADIANT COOLING SYSTEMS
Clarence A. Mills, Cincinnati, Ohio, assignor to Reflectotherm, Inc., Cincinnati, Ohio, a corporation of Ohio
Filed June 16, 1958, Ser. No. 742,123
4 Claims. (Cl. 62—380)

My invention relates to radiant cooling systems particularly in their use in association with cooling tunnels for nonmetallic materials such as candies and other confections and cakes and enrobed baked goods.

Many cooling tunnels in industry for cooling enrobed baked goods and the like consist of belt conveyors moving through enclosed casings or tunnels provided with fans directing cooling air currents against the candies or enrobed baked goods as they move along on the conveyor.

A general digest of the radiant heat-transfer problem in cooling tunnels incorporating radiant cooling systems has been disclosed in part in my Patent No. 2,783,618 granted March 5, 1957. The following additions and improvements to which this application relates are herein considered.

Non-metallic materials (such as candies) are largely transparent to radiations of wavelengths beyond 100 microns (Hertzian waves as used in diathermy). Passage of such radiations through non-metallic materials results in the absorption of varying amounts of this radiant energy by molecules throughout the mass and in an increase of their rotational activity and temperature levels.

Since radiant emissions and absorptions are known to be essentially identical processes but in opposite directions, it follows that molecular activity and temperature level can be reduced by external absorption of all such long infrared rays (short Hertzian radiations) emitted outward through the surrounding mass which is in turn largely transparent to energy in this range of wave lengths. Deep cooling of such materials is thus possible quite independently of other wavelengths of surface radiant emissions or of surface conduction-convection cooling. This includes especially the ready removal of the latent heat of "change of state," as in product solidification.

Radiant transparency of organic materials such as candies is proportional to the radiant wavelength involved. Such materials absorb most radiations below 1 micron wavelength but increase in transparency as wavelengths increase. Conductance of heat within a material is thus not a matter of molecule-to-adjacent-molecule energy transfer but rather a function of radiant wavelengths involved and the degree of the material's transparency. Radiations of shorter wavelengths may be absorbed and re-radiated several times in their passage from a material's center to its surface, while the rotational energy of its molecules and "change-of-state" give rise to long wavelength radiations which can exit directly.

For the radiant cooling of products such as cakes, thick slabs of raw meat, or other organic masses not undergoing a "change-of-state," I have found the usual radiant heat transfer formulas to hold fairly well. In such cases, the greater part of radiant emanation is from the material's outer layers and at the shorter infrared wavelengths to which the material is not transparent. I have found such radiant heat removal to take place equally well whether the cold plate surface be above the product or below, in which latter case convective cooling from cascading cold air currents could play no possible part. With cold plates positioned above the product to be cooled, product temperatures drop equally well.

Similar tests have been carried out with the radiant heating of products under conditions prohibiting air heating, and with the same clear dominance of radiant heat transfer.

I have found the radiant cooling of products to be largely independent of air movement or air temperature except under blast conditions or in cases where evaporative cooling can be a considerable factor. Radiant cooling without "change-of-state" exhibits the expected relationship to gradient of temperature difference between product and cold plate—the greater this difference the more rapid the radiant cooling.

Although most of a product's sensible heat radiates at the shorter infrared wavelengths, that being radiated from the material's molecules as they drop to a lower level of rotational or vibrational activity leaves directly from each molecule throughout the mass at the ultra-long wavelengths (100 to 400 microns) to which the material is transparent. Such radiations do not follow the usual surface emission laws; instead they contain a depth factor also.

With the emission of latent heat of "change-of-state" (as in solidifying chocolate), a quite different and seemingly puzzling situation exists. This heat is of electron origin and is emitted directly at ultra-long infrared wavelengths as the material changes from the liquid state into the fixed lattice crystalline structure of a solid with sharply restricted electron motion. These diathermy-type rays pass readily through most organic materials but are reflected back from metal surfaces unless such surfaces are carbon-blackened. Even a bismuth-blacked metal surface will reflect back 40 percent of radiant heat of 10 micron wavelength but it is almost completely reflective for the 100 to 400 micron wavelength radiations.

In planning the construction of a chocolate cooling tunnel to fit these radiant heat transfer facts, originally vertically-positioned cold plates (with reflectors and drip troughs) were used above the conveyor belt and a horizontal plate below the belt.

To simplify the tunnel design and make it possible to operate the cold plates at sub-freezing temperatures, I have changed to plates positioned horizontally above and below the conveyor belt which itself should be of infrared-transparent material.

By properly controlling relative humidity within such tunnels so as to prevent moisture condensation on the ray absorbing units comprising cold plates the system can be operated at any desired receiving temperature.

These considerations become very pertinent and important in such commercial operations as the setting-up and hardening of chocolate coatings and blocks, as well as in other organic "change-of-state" processes. Chocolate-coated products can be fully hardened by exposure in still air to ray absorbers comprising liquid-chilled carbon-blacked cold plates at temperature gradients and time intervals adequate only for radiant transfer of the necessary sensible heat according to the Stefan-Boltzmann formula. The latent heat liberated in the chocolate's "change-of-state" is several times greater than the sensible heat given off in its temperature drop down to the crystallization point, and there can be no question that this large amount of ultralong wavelength latent heat is absorbed by the carbon-blacked cold plates and removed by the chiller equipment; it shows up clearly in the refrigeration loads encountered.

Receiving temperatures of the absorbers comprising blackened cold plate surfaces are of prime importance in the sensible cooling of materials down to the "change-of-state" point, but theoretically these temperatures are of little importance in the latent heat transfer so long as adequate heat removal facilities are incorporated into the ray absorbing system.

Herein lies the inherent weakness of attempted air-cooling of products undergoing "change-of-state" in metal-enclosed tunnels or cabinets. The longwave latent heat flashes out to be reflected back from or absorbed on enclosed walls and these walls must now be cooled by air-stream contact, else their warmed surface will reradiate shorter rays back onto the product. Here the old battle of air vs. fluid-line cooling of surfaces definitely and clearly resolves in favor of the fluid-line.

Properly planned radiant cooling thus carries clear advantages over air cooling for sensible heat removal from products, but for latent removal from "change-of-state" processes its use becomes almost imperative if proper crystalline structure and heat removal economy are to be achieved. So-called air cooling of products is usually to a large degree indirect and inefficient radiant cooling via the metal enclosure surfaces. Too rapid cooling of hardening products by cold air currents must be avoided, because of surface case-hardening while the deeper layers are still liquid. No such precautions are needed with radiant cooling, however, since the radiant "change-of-state" heat exists freely from the deeper portions as well as from the surface of the mass.

Certain important considerations dominate the planning and design of enclosed radiant cooling systems in tunnels. It is my belief that the use of ray absorbers comprising fluid-line cold plates, in combination with dewpoint or humidity control so as to allow of sub-freezing temperature operations without moisture deposition on the plates, is a novel art and teaching with regard to the radiant cooling of products. Essentially I have devised a system composed as follows:

(a) a refrigerating or liquid cooling source to maintain any desired circulating fluid temperature.

(b) means for circulating the chilled fluid from refrigerating source through the cold plates and back.

(c) Ray absorbers comprising fluid-chilled cold plates positioned horizontally above and below product conveyor belt (or laterally in the case of suspended products). These cold plates may be left fully exposed to the tunnel air, in which case the dew-point of the tunnel air must be kept below the temperature at which the plates are to be operated.

(d) The amount of such air having a predetermined dew point or relative dehumidifying properties to be forced into the tunnel should be sufficient to cause an exit velocity of about 10 feet per minute at the tunnel's feed and discharge openings in order to prevent outer room water vapor from diffusing into the tunnel apertures.

($e^1$) Humidity control of tunnel air in the case of ray absorbers comprising fully exposed cold plates requires a precooling dehumidifying water coil, a chemical air drying unit positioned as will be indicated, and a second chilled water coil to recool the chemically dried air down to a temperature of about 38° to 40° F. before its entrance into the tunnel (f).

($E^2$) Humidity control of the tunnel air in the case of the polyethylene enwrapped cold plates requires only the precooling dehumidifying coil.

The novel feature here proposed is the use of dehumidified air for needed control of dew-point or relative humidity of the air which passes into immediate contact with the cold plate surface or the polyethylene wrappings thereof. This enables the use of sub-freezing plate temperatures for rapid radiant cooling.

To illustrate diagrammatically the practical application of my system to a commercial type radiant cooling tunnel I have illustrated in FIGURE 1 a diagrammatic representation of a cooling tunnel having unwrapped exposed ray absorbing plates of the tube-in-strip type.

In FIGURE 2 I have illustrated diagrammatically one arrangement of apparatus for controlling a volume of air passing to the cooling tunnel to a predetermined dew point in which the ray absorbers comprise unwrapped exposed long ray absorbers.

Figure 1:
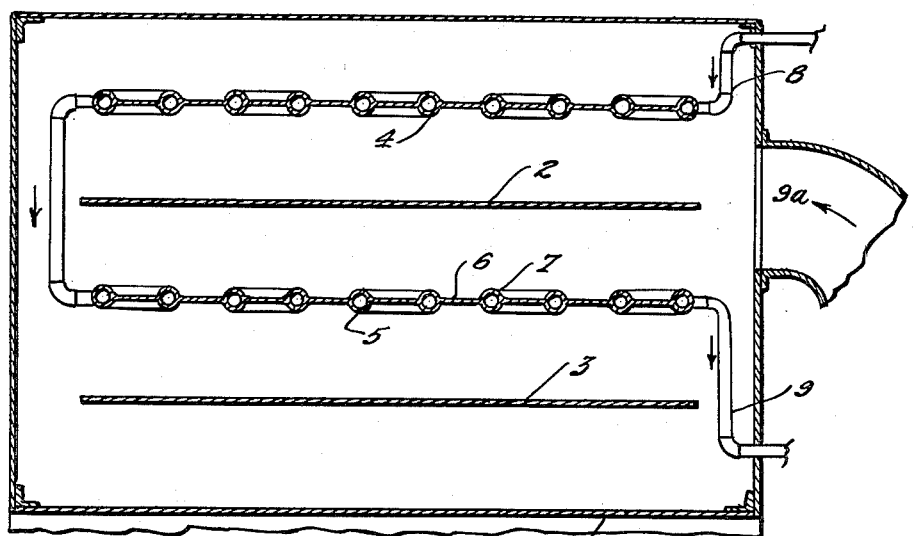

The tunnel walls are diagrammatically illustrated at 1. The feed belt is indicated at 2 and the return belt at 3. Parallel to and spaced above and below the feed belt are the radiant cooling plates 4 and 5. These cooling plates are preferably of the tube in strip type, and consist in plates 6 having parallel coils 7 integrally formed with the plates. The internal feed manifold through which cooling fluid is supplied to the tubes is indicated at 8 and the internal return manifold is indicated at 9. In the side wall of the tunnel 1, I have indicated at 9a the opening through which the air having the predetermined dew point is introduced into the tunnel forming a layer of conditioned air below the upper radiant cooling panel and above the lower radiant cooling panel.

The conveyor belt is preferably made of a plastic canvas combination which is readily penetrated by ultra long (100 to 400 micron) radiant rays emitted by the articles on the conveyor.

For controlling the dew point of the air admitted to the cooler, I have indicated the two brine coils 10 and 11 supplied with brine of a predetermined temperature through a one-way flow valve 11. The brine or other coolant liquid flows to the brine coils, the outlets of which connect with a circulator pump 12. The recirculated coolant liquid passes to a thermostat 13 which controls the flow and temperature of the recirculated liquid to the three way motorized mixing valve 14, from which a certain amount of coolant liquid flows back and mixes with inlet liquid. In the event the temperature control waivers the other branch line permits a return to the coolant liquid supply through the pipe 15.

The air conditioner within the casing introduces air through the air filter 16. After being cooled through the first set of cooling coils during which the dew-point as well as the temperature is reduced, the air passes through a dehumidifier unit in which deliquescent chemicals in trays still further reduce the dew-point of the air. This action gives off heat so that the air leaving the dehumidifier unit is too warm for introduction into the cooling conveyor. To again reduce the temperature a desired amount the air passes through the second brine cooling chamber and is then taken into the blower 17 from which it is discharged through the duct 18 into the air distribution opening 9a in the tunnel side wall.

It should be understood that the quantity of air discharged into the tunnel is of no significance since all that is required within the tunnel is only enough to pass out of the openings in the conveyor at a rate of 10 feet a minute, just enough to insure that no room air carrying a heavy load of moisture will get into the cooling tunnel.

As an example of one operating condition if the temperature of the cold plates is maintained at 20° F., the dew point of the air introduced into the tunnel will be about 18° F. This will insure that there will be no condensation of moisture on the cooling plates. It is essential that there be no appreciable condensation of moisture on the cooling plates both because of water dripping on the articles moving along on the conveyor and because the efficiency of the cooling plates will be materially reduced.

I have noted only one proposed operating temperature for the cold plates. Other temperatures will be required depending on the articles on the conveyor and the rate of cooling planned. The important condition is that the dew point of the conditioned air introduced will be such that moisture will not form on the cold plates.

Figure 3:
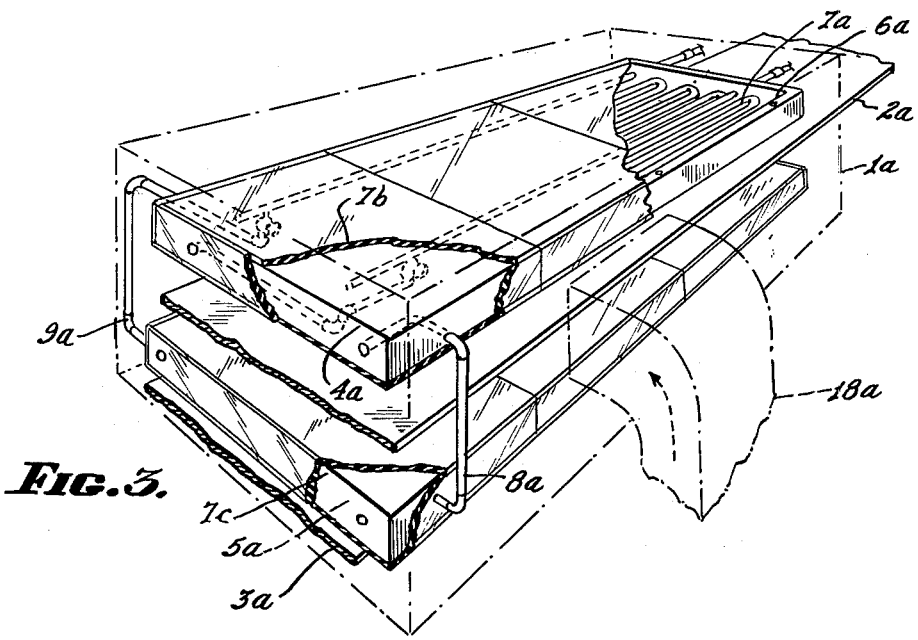
FIGURE 3 is a sectional view of a cooling tunnel having ray absorbers comprising polyethylene enwrapped cooling plates.

When the cold plates as illustrated in FIGURE 3 are sealed within a polyethylene wrapper the only requirement is that the relative humidity of the tunnel air be kept below the point at which moisture begins to condense on the polyethylene wrapping.

I have found the following formula adequate to prevent moisture depositing on the polyethylene enwrapment. For example, if it is desired to operate the ray absorbing units with the plates maintained at 10° F., the air entering the tunnel should be dehydrated to about 38° F. wet bulb. This air becomes rewarmed in its passage to the tunnel to about 45° F. dry bulb so as to provide a relative humidity (R.H.) of 50% saturation. Actual tests have indicated that moisture will not condense on the polyethylene wrapping under such tunnel air conditions until the plate temperatures have been reduced to about 0° F. or 10° F. below the desired plate operating temperature. Thus we have the formula:

Safe plate temperature=wet bulb temperature of tunnel air minus (100 minus actual R.H. of tunnel air in percent)×.8. R.H. is the abbreviation for "relative humidity" or percent of saturation.

Figure 2:
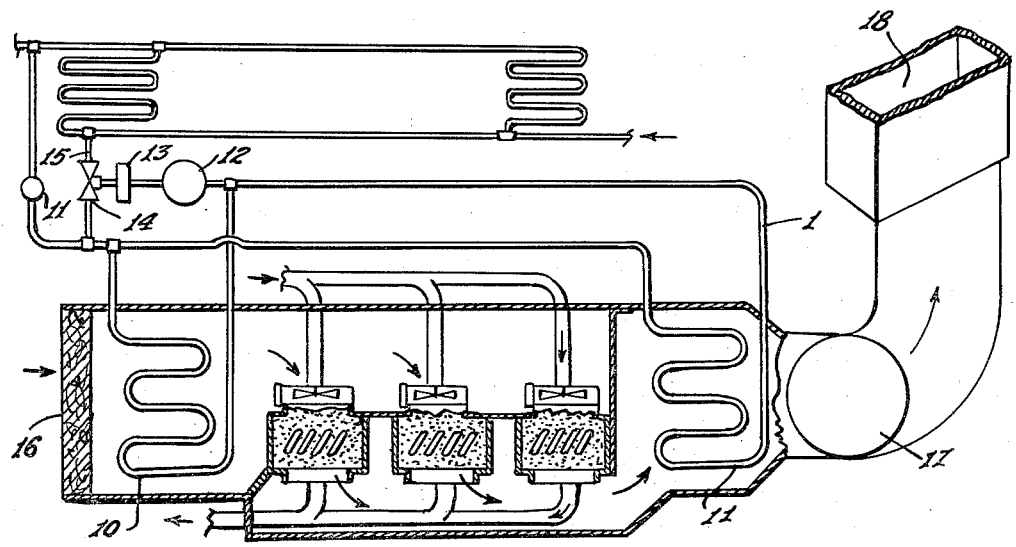
Figure 4:
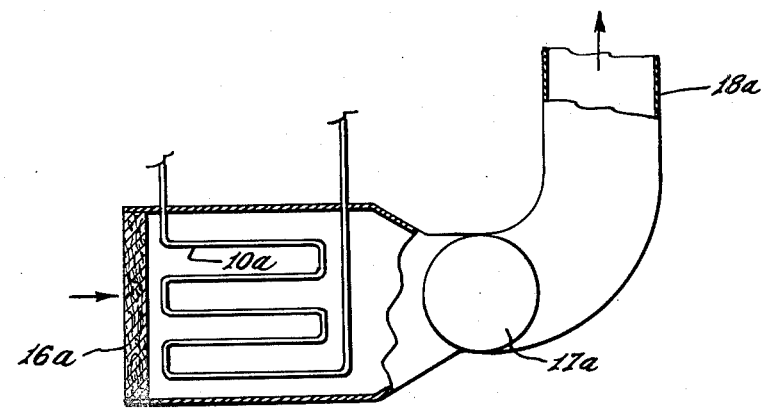
FIGURE 4 is a sectional view of the cooling tunnel of FIGURE 3 illustrating a dehumidifying system for the air passing to the cooling tunnel.

In FIGURES 3 and 4 the tunnel walls are diagrammatically illustrated at $1a$. The feed belt is indicated at $2a$ and the return belt at $3a$. Parallel to and spaced above and below the feed belts are the radiant cooling plates $4a$ and $5a$. As in FIGURES 1 and 2 the cooling plates in FIGURES 3 and 4 are of the same tube in strip type the plates $6a$ having parallel coils $7a$ integrally formed with the plates. The cooling plates in FIGURES 3 and 4 are enwrapped with polyethylene sheets or panels as indicated at $7b$, $7c$.

The internal feed manifold through which cooling fluid is supplied to the tubes is indicated at $8a$ and the internal return manifold is indicated at $9a$. In the side wall of the tunnel $1a$ in FIGURE 4 I have shown the opening through which the air having the predetermined relative humidity is introduced into the tunnel forming a layer of conditioned air below the upper radiant cooling panel and above the lower radiant cooling panel.

For controlling the dew point of the air admitted to the cooler there are indicated the brine coils $10a$ supplied with brine through a one way flow valve. The brine or other coolant liquid flows to the brine coils the outlets of which connect with a circulator pump. The recirculated coolant liquid may pass to a thermostat which controls the flow and temperature of the recirculated liquid to a three-way motorized mixing valve from which a certain amount of coolant liquid flows back and mixes with inlet liquid. In the event the temperature control waivers the other branch line permits a return to the coolant liquid supply.

In the modifications shown in FIGS. 3 and 4 the air conditioner within the casing introduces air through the air filter $16a$ and the passage of the dehumidified air passes through the blower $17a$ and the conduit $18a$.

Having thus described my invention what I claim as new and desire to secure by Letters Patent is:

1. A system for continuously controlling radiant cooling in an open ended conveyor cooling tunnel which is provided with a conveyor belt penetrable to ultra long heat waves radiation and which has a pair of radiant ray absorbing units comprising flat carbon black coated cooling plates, one spaced above and the other below the conveyor belt, which includes the step of introducing into the tunnel air currents of air treated so as to reduce the dew point below that temperature at which moisture would otherwise be condensed on the radiant ray absorbing units.

2. A system for continuously controlling radiant cooling in an open ended conveyor cooling tunnel which is provided with a conveyor belt penetrable to ultra long heat waves radiation and which has a pair of radiant ray absorbing units comprising flat carbon black coated cooling plates, one spaced above and the other below the conveyor belt, which includes the step of introducing into the tunnel air currents of air treated so as to reduce the dew point below that temperature at which moisture would otherwise be condensed on the radiant ray absorbing units, and controlling the volume of treated air introduced into the tunnel to a rate of discharge of substantially ten feet per minute.

3. A system for continuously controlling radiant cooling in an open ended conveyor cooling tunnel which is provided with a conveyor belt penetrable to ultra long heat waves radiation and which has a pair of flat carbon black coated cooling plates, one spaced above and the other below the conveyor belt, which includes the step of introducing into the tunnel air currents of air treated so as to reduce the dew point below that temperature at which moisture would otherwise be condensed on the cooling plates.

4. A system for continuously controlling radiant cooling in an open ended conveyor cooling tunnel which is provided with a conveyor belt penetrable to ultra long heat waves radiation and which has a pair of flat carbon black coated cooling plates, one spaced above and the other below the conveyor belt, which includes the step of introducing into the tunnel air currents of air treated so as to reduce the dew point below that temperature at which moisture would otherwise be condensed on the cooling plates, and controlling the volume of treated air introduced into the tunnel to a rate of discharge of substantially ten feet per minute.

References Cited in the file of this patent

UNITED STATES PATENTS

| | | |
|---|---|---|
| 1,753,828 | Greer et al. | Apr. 8, 1930 |
| 2,254,420 | Cleveland | Sept. 2, 1941 |
| 2,425,714 | Baer | Aug. 19, 1947 |
| 2,460,150 | Schupp | Jan. 25, 1949 |
| 2,783,618 | Mill | Mar. 5, 1957 |